Feb. 18, 1936.  O. U. ZERK  2,031,355
WHEEL AND WHEEL COVER
Filed Dec. 12, 1932  2 Sheets-Sheet 1
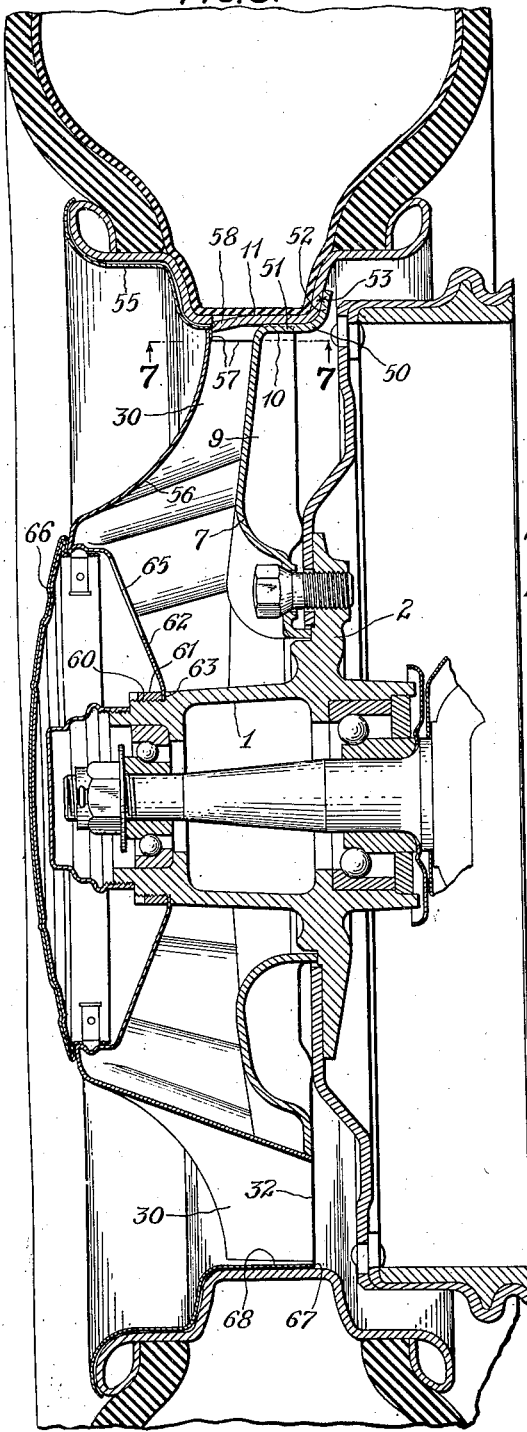
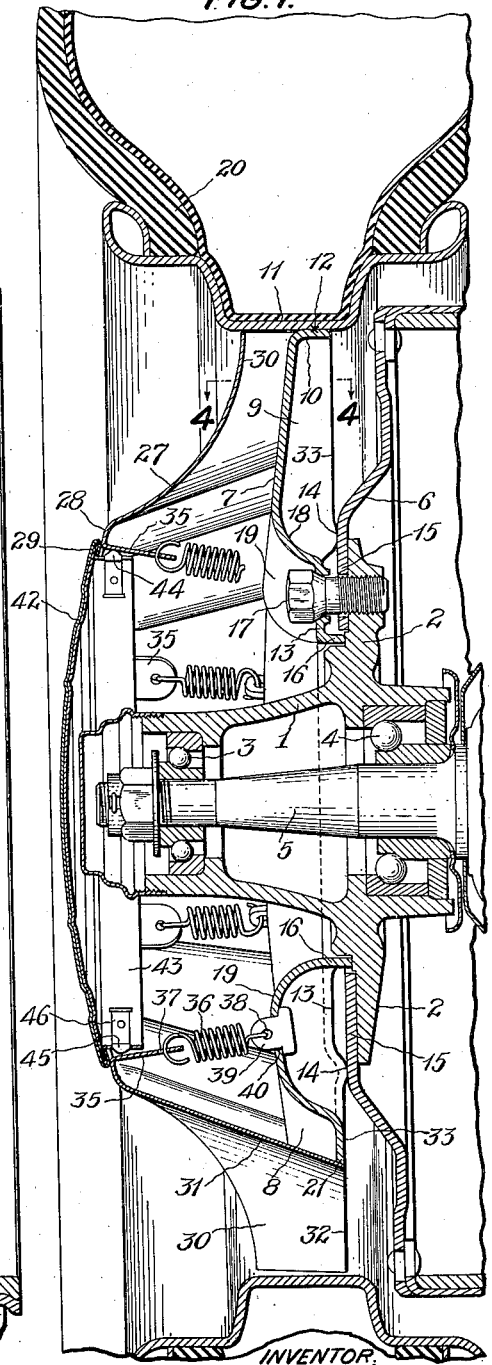
INVENTOR
Oscar U. Zerk
BY Slough and Canfield
ATTORNEYS

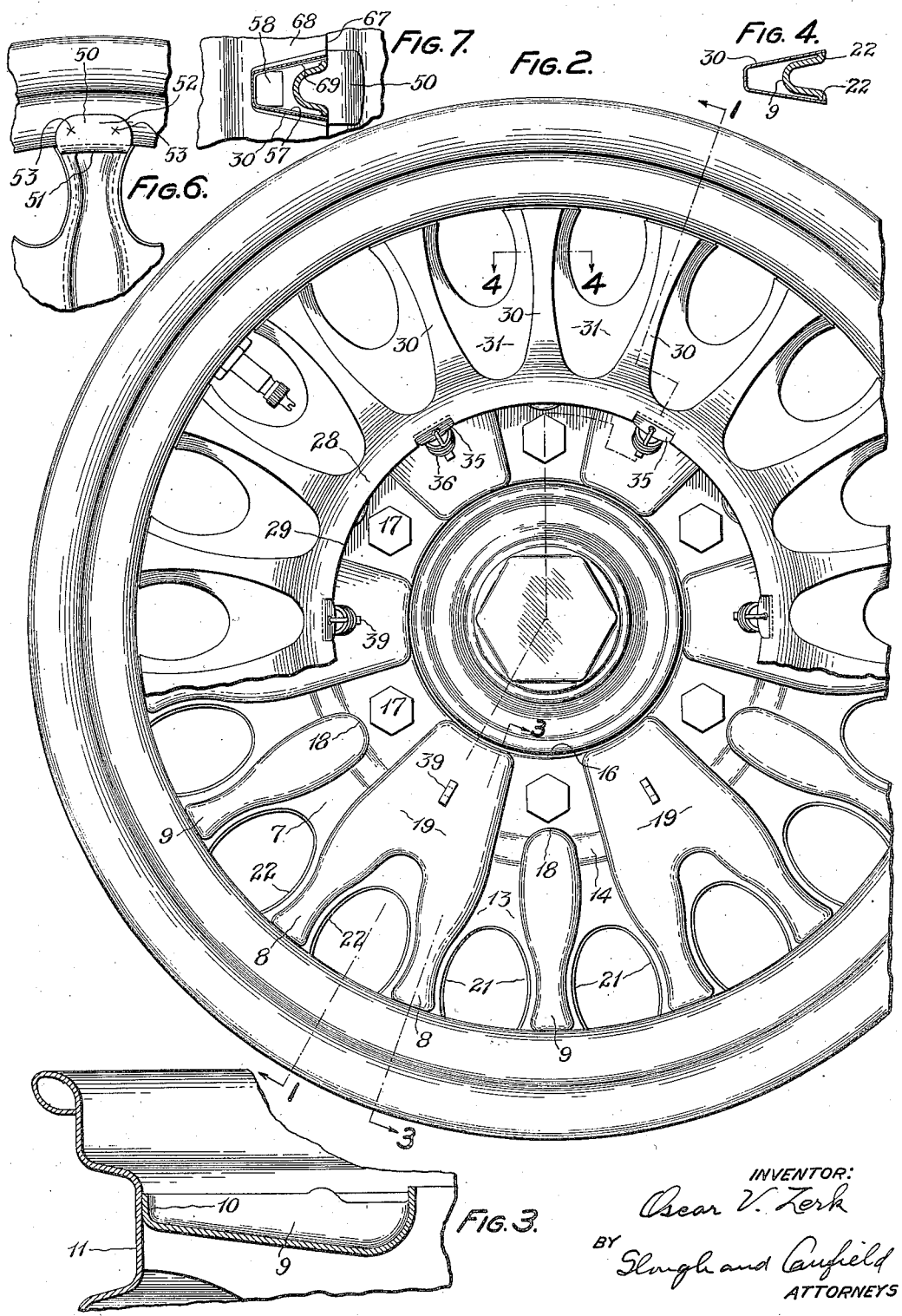

Patented Feb. 18, 1936

2,031,355

UNITED STATES PATENT OFFICE 2,031,355

WHEEL AND WHEEL COVER

Oscar U. Zerk, Chicago, Ill.

Application December 12, 1932, Serial No. 646,859

3 Claims. (Cl. 301—37)

My invention relates to wheels and the covers therefor.

Although my invention is not limited to any class of wheels, it has particular application to wheels of automotive vehicles.

The present application relates to an improved wheel construction comprising a demountable wheel body having a relatively simple spider extending radially between the inner hub of the wheel and the supported rim and demountably interconnecting said hub and rim, and in addition comprising a relatively light thin sheet metal cover superposed over the spider and preferably also over the wheel nave construction and in some cases over a portion of the rim, said cover masking the spider and rim and giving the wheel an appearance having a distinctive aesthetic appeal to the eye.

The wheel of the present invention has the valuable advantage that whereas the rim and spider may be of a standard form, they may be combined with covers of a variety of forms presenting distinctly different appearances and which are interchangeable for use in connection with a single rim and spider design.

Thus a wheel of this proposed construction not only has the advantage that it is extremely light in weight but has the further advantage that the cover which constitutes a hub and spoke simulating portion, is removable and readily and quickly interchangeable, and may be replaced should it accidentally become dented or otherwise injured by collision.

It is therefore an object of my invention to provide an improved automotive vehicle wheel.

Another object is to provide a wheel of the class described whereof the spider may be made of relatively thin material strengthened by radially arranged relatively deep ribs extending from a point near the outer peripheral rim-engaging portion to a point inwardly of the wheel fastening bolts, and to a point relatively near the inner hub or hub proper of the wheel and increasing in depth inwardly.

Another object is to provide a wheel of the class described provided with an improved outboard spoke and hub simulating wheel cover quick-detachably connected to the wheel proper.

Another object is to provide, in a wheel of the class described comprising an inner load-carrying spider and an outer hub and spoke simulating cover, improved spring means to yieldingly connect the cover to the spider or to portions of the wheel connected to the spider.

Another object of my invention is to provide, in a wheel comprising an inner load-carrying spider and an outer hub and spoke simulating cover, improved means to prevent relative rotation of the cover.

Another object is to provide, in a wheel of the class described comprising a wheel fastening flange and fastening bolts and comprising an outer hub and spoke simulating cover and resilient means to draw the cover toward the flange, an improved arrangement of the resilient means whereby the elements thereof may not interfere with the application of wrenches to the fastening bolts.

Other objects will be apparent to those skilled in the art to which my invention appertains.

My invention is fully disclosed in the following description taken in connection with the accompanying drawings, and in which:—

Fig. 1 is a cross-sectional view of a wheel embodying my invention in one form, the view being taken approximately from the plane 1—1 of Fig. 2;

Fig. 2 is an elevational view of the embodiment of my invention shown in Fig. 1 with parts thereof removed and parts broken away for clearness;

Fig. 3 is a fragmentary sectional view taken from the plane 3—3 of Fig. 2;

Fig. 4 is a fragmentary cross-sectional view taken from the plane 4—4 of Fig. 1;

Fig. 5 is a view similar to Fig. 1 illustrating another embodiment of my invention;

Fig. 6 is a fragmentary elevational view of a part of Fig. 5;

Fig. 7 is a fragmentary sectional view taken from the plane 7—7 of Fig. 5.

Referring to the drawings, I have shown generally at 1 an inner hub or hub proper comprising an integral flange 2 and provided inwardly with suitable bearings 3 and 4 to rotatably support a vehicle axle 5. Secured to the flange 2 is a portion 6 of a brake drum. These parts constitute no essential part of my invention and may be of well known or suitable construction.

At 7 I have indicated generally a spider, pressed from sheet metal and formed to provide a plurality of radially extending ribs 8—8 and 9—9. The spider 7 is peripherally circular and at the outer terminations of the ribs 8 and 9 the metal of the spider is pressed to close the ends of the ribs as at 10. A plurality of outwardly closed channel-form ribs are thus provided and the closed outer ends of the ribs are all annularly disposed on a diameter substantially the same as the inner diameter of the sheet metal wheel rim shown generally at 11.

The rim and the spider 7 are integrally joined together by welding the closed ends 10 of the channel-form ribs to the rim 11 as at 12. The spider 7 is formed with an annular substantially planar portion 13 from which the ribs 8 and 9 are pressed in the outboard direction. In the inboard direction, an annular bead 14 is pressed adapted to engage the hub flange 2 or to engage a portion 15 of the brake drum overlapping the flange 2; and the planar portion 13 is centrally perforated and bent in the inboard direction to provide an annular flange 16 adapted to engage the flange 2 of the hub.

A circular series of bolts 17 are projected through suitable perforations in the planar portion 13 and threaded into the flange 2 whereby the spider 7 may be rigidly mounted upon the flange 2 by clamping action upon the flange 16 or the flange 16 and the bead 14.

The ribs 9, as shown in Fig. 2, are aligned radially with the bolts 17 and stop inwardly short thereof as shown at 18. The ribs 8—8 proceed inwardly radially and at a point substantially midway between their outer ends and the flange 16 are joined in a relatively wide rib or channel portion 19. The ribs or channel portions 19 extend inwardly radially substantially to the flange 16.

The spider 7 constructed as described above combines the maximum of rigidity and strength with the minimum of material. By strengthening relatively thin sheet metal by means of the ribs 8 and 9 and the rib portions 19, the bead 14 and flange 16, and rigidly joining the outer ends of the ribs to the rim 11, a light weight but strong wheel spider is provided for transmitting load from the hub 1 to the rim 11 and a tire 20 thereon. Due to the relatively small diameter of the rim 11 where super balloon tires are used, the outer diameter of the spider 7 is correspondingly small and the metal from which the spider 7 is made may for this reason also be relatively light weight.

For cooperation with a cover to be described, the sheet metal from which the spider is made is cut away as at 21—21 to provide a circular series of openings therein. The openings 21 may be shaped in correspondence with associated parts of the cover to be described. In the form illustrated, Fig. 2, they are generally of oval shape, and the peripheral edges of the openings 21 are beveled as at 22 (see also Fig. 4), the purpose of which will be described.

The openings 21 extend, circumferentially, over most of the distance between adjacent ribs 8—8 or 8 and 9 and inwardly radially extend a suitable distance to be determined by corresponding portions of the cover spider to be described.

At 27 I have indicated generally an improved cover for the wheel and which is press-formed from sheet metal of relatively thin gauge such as No. 20 U. S. gauge and is formed smoothly to the form to be described, in order that it may be ornamental and to this end is preferably externally plated with chromium, or otherwise given a pleasing outer appearance.

The cover 27 comprises a central annular portion 28 of slightly larger diameter than the circle of bolts 17 whereby access may be had by wrenches through the central perforation 29 of the annular portion 28. Extending outwardly radially from the annular portion 28 is a relatively large number such as eighteen, spoke simulating ribs 30—30, formed concave in the outboard direction as well as in the circumferential direction on both sides of the spoke portions.

Between the spoke portions 30—30 the cover 27 is press-formed to provide an outer hub portion 31, the hub portion 31 merging with each pair of adjacent spoke portions 30. It will be seen that the spoke portions 31 are generally of channel form concave in the inboard direction, and preferably the outer hub portion 31 and the flanges of the channel-form spoke simulating portions 30—30 terminate in the inboard direction substantially in a plane 32, Fig. 1, which is preferably the inboard terminal plane of the ribs 8 and 9 of the spider 7 as shown at 33—33.

The spoke portions 30 and ribs 8 and 9 are of equal number and equally spaced circumferentially so that the channel-form outer ends of the portions 30 may straddle the outer ends of the ribs as shown plainly in Fig. 4, and the open ends of the channel portions 30 may, in cross-section, be outwardly divergent, and thus may wedgingly engage the beveled portions 22—22 of the openings 21. Thus axial thrust on the cover 27 in the inboard direction will wedgingly engage each spoke portion 30 with a corresponding rib portion of the spider 7 to firmly secure the cover 27 on the spider 7 and the following means is provided to effect this thrust and in a resilient manner.

At the central periphery 28 of the cover 27, a plurality such as six tongues 35 are bent inwardly and one end of a compression spring 36 is hooked into a suitable perforation 37 in each of the tongues. The other end of the spring 36 is hooked through a perforation 38 in a generally T-form anchoring device 39 preferably stamped from sheet metal, the shank of the T extending outwardly through a perforation 40 in each of the rib portions 19 and the head of the T engaging the underside of the ribs. The six springs thus provided exert an inboard resilient thrust on the cover 27 for the purpose described.

It will be observed that although the inner ends of the spring 36 are disposed where they are accessible through the central perforation 29 of the cover 27, they are suitably staggered with respect to the bolts 17 so as not to interfere with access of the bolts by wrenches for the usual purpose.

Although six springs are shown, it will be understood that fewer may be employed if desired, and furthermore, by the employment of six, if any one or several springs should break, the remaining springs will be sufficient to hold the cover 27 in place.

Due to the relatively nesting relation of the ribs 8 or 9 and the cover portions 30, the cover 27 is prevented from slipping circumferentially of the spider 7 without employment of any means specifically for this purpose.

The central perforation 29 is covered by a sheet metal cap 42 which may be suitably press-formed to render the same ornamental. To secure it in place it is preferably provided with an annular flange 43 extending into the perforation and with resilient outwardly radially pressed devices 44 adapted to engage the inner side of the peripheral edge 29.

The devices 44 may comprise button-like elements 45 on the free ends of flat springs 46, the opposite ends of which are affixed as at 47 to the inner wall of the flange 43 and the button-like elements 45 may project through suitable perforations in the flange 43.

It will thus be seen that by the foregoing construction I provide a wheel comprising two superposed sheet metal spoked elements including an inboard spider for securing the rim and hub proper together, formed regardless of appearance, to provide the necessary strength with the very minimum of material and weight; and an outer cover comprising spoke simulating portions and an outer hub portion, made of light gauge material, carrying none of the wheel load, formed to ornamental shape, adapted to be plated to render it aesthetically pleasing and secured to the inboard spider by readily detachable means which hold it securely and noiselessly in place on the inboard spider and yet permit of its ready removal for replacement purposes in case of damage thereto; and the cover and attaching means do not in any way interfere with access to the wheel attaching bolts.

Referring to the embodiment of Fig. 5, I have shown the closed ends 10 of the ribs 9 as continuing in the form of tongues 50 along the radially inward and inboard portions of the rim 11, for example as at 51 and 52. In this form, the tongues 50 may be welded to the rim on an inboard portion thereof, for example as at 53. This form admits of welding the parts together by a different movement of the welding machinery.

In the form of Fig. 5 also, the cover comprises a wheel rim covering portion 55 in addition to the spoke simulating an outer hub spider portion or cover portion 56. The rim covering portion 55, as illustrated in Fig. 5, may conform generally to the shape of the rim, particularly the outboard portions thereof, and in the embodiment illustrated extends in the inboard direction substantially to the plane 32 above described as shown at 67. Thus a portion 68 of the rim cover covers the inner surface of the rim between the spoke portions 30. At the spoke portions 30, the rim covering portion 68 is notched as shown at 69 to straddle the spider ribs 8 and 9, the notches having border flanges 57 formed integral therewith, the flanges 57 being substantially of the same shape and extent as the inner surfaces of the spoke portions 30, the flanges 57 thus nesting with the spoke portions 30 as shown in Fig. 7.

Thus the outer radial ends of the spoke portions 30 straddle and entirely cover the flanges 57 on the rim covering portion 55 and the inboard thrust provided to hold the cover on the wheel forces the ends of the spokes into engagement with the flanges 57 and also holds the rim cover portion on the wheel.

Preferably tongue portions 58 are cut and pressed inwardly radially from the rim 11 in position to support the rim flanges 57, as illustrated in Fig. 5; and thus the tongues 58 may take up the axial thrust acting upon the cover or may determine its position relative to the rim and spider 7.

The cover 56 is otherwise generally of the same form as that of the first described embodiment.

Upon applying inboard thrust upon the spider cover 56, it will, as will now be understood, engage the radial ends of the spoke portions 30 with the rim cover flanges 57 and engage them with the tongues 58 and thus hold the rim cover portion securely on the rim and will nest the spoke portions 30 upon the rim flanges 57 and securely hold the cover 56 itself on the spider 7. To provide this inboard thrust, the resilient means or springs shown and described in the embodiment of Fig. 1 may be employed. However, in the form of Fig. 5 I have illustrated a modification of this means. In this form, the central part of the cover 56 is depressed in the inboard direction and centrally perforated to telescope over a threaded portion 60 of the hub 1. A nut 61 on the threads 60 clamps the depressed portion 62 upon a shoulder 63 on the hub, and by suitably shaping the depressed portion 62, it may, when so clamped, exert an inboard thrust on the entire cover 56 as will be understood.

The depressed portion 62 is provided with a circular series of perforations 65 each of which is disposed opposite one of the bolts 17 to give access thereto through the perforations. A cap 66 is provided similar to the cap 42 above described and may be removably attached in a manner similar thereto.

In the form shown in Fig. 5, the rim covering portion 55 is made separately from the spider 56, but as will be understood by those skilled in this art, it may be made integral therewith; and it is not believed necessary herein to illustrate and describe such integral construction.

As will now be apparent, in each of the embodiments of my invention described above, the ornamental cover is quickly detachable from the spider. In the form of Fig. 1, upon removing the cap 42, the springs 36 may be unhooked from the lugs 35 or from the devices 39 and the entire cover removed, and in the reverse manner the same cover or a replacement cover may be replaced.

In the form of Fig. 5, after removing the cap 66 the nut 60 may be unscrewed to permit removing and replacing the spider 56. Inasmuch as the depressed portion 62 may be inherently resilient, I have thus provided in the form of Fig. 5 a single resilient means and in the form of Fig. 1 a plurality of resilient means, both quickly detachable, for the covers.

If preferred, the rim 11 and spider portions 10 may be riveted together, instead of welded, by an annular series of rivets projected through suitable aligned perforations therein.

My invention is not limited to the exact details of construction shown and described inasmuch as many changes and modifications may be made within the scope and spirit of the invention without sacrificing its advantages.

I claim:

1. A sheet metal cover for wheels of the type comprising a rim, and a plurality of circumferentially spaced inwardly projecting tongue elements thereon, the cover comprising an outer hub portion and radially extending spoke simulating generally channel-form portions, and an annular rim cover portion, the rim cover portion comprising a circumferential series of flanges overlapping the tongue elements, and the ends of the spoke simulating portions overlapping the flanges, and resilient means exerting inboard thrust on the cover to hold the spoke simulating portions and the rim cover portion on the tongue elements to hold the cover on the wheel.

2. A sheet metal cover for vehicle wheels of the type comprising a central hub portion, a felloe portion provided with a plurality of circumferentially spaced inwardly projecting tongue elements, and a plurality of radially extending spoke portions generally of channel form inboardly concave secured to the felloe portion and hub portion, the cover comprising a central nave portion and a plurality of spoke simulating portions extending radially therefrom, generally of channel form inboardly concaved and mutually nestable with the wheel spoke portions, and resilient means secured to the cover and to the wheel constantly urging the radially outermost spoke simulating cover portion axially inwardly toward said tongue elements to resiliently maintain the cover upon the wheel.

3. In a cover for wheels of the type comprising spoke portions and a generally circular series of wheel hub attaching elements, a sheet metal stamping for masking portions of the wheel comprising a generally central portion depressed inwardly axially, means for connecting the depressed portion to a central portion of the wheel to exert inward axial thrust on the stamping, a generally circular series of openings in the depressed portion adapted to give wrench access therethrough to the wheel hub attaching elements, the stamping comprising generally channel form spoke simulating portions adapted to nest with the wheel spoke portions to predetermine relative rotated positions of the wheel and stamping to align the said openings with the said wheel hub attaching elements.

OSCAR U. ZERK.